United States Patent
Cannon, Jr.

(10) Patent No.: US 9,605,799 B1
(45) Date of Patent: Mar. 28, 2017

(54) DUAL ANCHOR DEVICE

(71) Applicant: Thomas Calvin Cannon, Jr., Las Vegas, NV (US)

(72) Inventor: Thomas Calvin Cannon, Jr., Las Vegas, NV (US)

( * ) Notice: Subject to any disclaimer, the term of this patent is extended or adjusted under 35 U.S.C. 154(b) by 18 days.

(21) Appl. No.: 14/983,619

(22) Filed: Dec. 30, 2015

(51) Int. Cl.
*F16M 13/00* (2006.01)
*F16M 13/02* (2006.01)

(52) U.S. Cl.
CPC .................................. *F16M 13/02* (2013.01)

(58) Field of Classification Search
CPC .. H02G 3/32; H02G 3/30; H02G 3/26; H02G 3/263; H02G 3/0418; H02G 3/0468; H02G 3/0487; H02G 11/006; H02G 3/0456; H02G 3/0691; H02G 3/0425; H02G 11/00; H02G 1/00; H02G 3/00; H02G 3/04
USPC ........ 248/49, 65, 71, 220.21, 224.8; 411/44, 411/80.5
See application file for complete search history.

(56) References Cited

U.S. PATENT DOCUMENTS

| | | | | |
|---|---|---|---|---|
| 3,116,528 A * | 1/1964 | Poe | ......................... | A47B 95/02 411/15 |
| 4,027,847 A * | 6/1977 | Johnson | .............. | E04G 17/0644 249/190 |
| 4,114,509 A * | 9/1978 | Poe | ..................... | F16B 19/1081 24/607 |
| 4,369,947 A * | 1/1983 | Kuwano | ................... | F16L 3/04 174/164 |
| 4,403,377 A * | 9/1983 | Mizusawa | ........... | F16B 19/1081 24/297 |
| 5,209,621 A * | 5/1993 | Burbidge | ............ | F16B 13/0808 411/340 |
| 6,287,044 B1 * | 9/2001 | Huber | ..................... | F16B 12/14 403/297 |
| 7,726,922 B2 * | 6/2010 | Slyter | ................... | F16B 5/0685 24/297 |

\* cited by examiner

*Primary Examiner* — Steven Marsh

(57) ABSTRACT

The present invention is a dual anchor device that quickly, inexpensively and space-efficiently anchors objects to free-standing slabs. The dual anchor device consists of a notched stem and a bushing. The device works by first inserting the bushing into a hole through a free-standing slab, and then inserting the notched stem into the bushing. Doing so automatically anchors the entire assembly to the free-standing slab. The bushing employs a first anchoring mechanism, consisting of flexible legs, which automatically latch onto free-standing slabs, and a second anchoring mechanism, consisting of a split sleeve possessing ledges that latch onto the notch in the stem.

2 Claims, 3 Drawing Sheets

US 9,605,799 B1

DUAL ANCHOR DEVICE

This invention relates to automatically anchoring objects to free-standing surfaces or slabs such as boards, plates, wallboard, hollow doors, and lids. More specifically, this invention relates to a dual anchor device that automatically mounts onto a free-standing slab, and, in turn, automatically latches onto objects inserted into the device, thereby securely anchoring the object to the free-standing slab. In the context of this invention, a free-standing slab is a body of material that has free space on the two opposing sides of its minor dimension. A dual anchor device is useful for (1) anchoring electrical components to printed wiring boards, (2) mounting objects to hollow walls, and (3) affixing objects to metal or plastic plates, for example. Of particular interest is mounting objects such as check valves to the walls and lids of containers. Of prime importance is that a dual anchor device be compact, and quickly installable, because those attributes maximize its utility across all fields of use.

The dual anchor device presented in this invention consists of an object anchor and a bushing. The object anchor must be either attached to or integral with the object to be mounted to a slab. The dual anchor device requires a small hole (circular or otherwise) drilled or punched through a free-standing slab. The bushing automatically anchors itself to the slab when inserted through the small hole. The object anchor automatically anchors itself to the bushing when inserted into the bushing. These two consecutive anchoring actions mount the object of interest to the slab.

BACKGROUND OF THE INVENTION

The prior art is replete with devices for anchoring objects to surfaces. For example, commonly available hollow-wall anchors are used to anchor pictures, mirrors, and other household objects to walls and doors. The hollow-wall anchor consists of a thin-wall split cylinder surrounding a screw that runs the length of the split cylinder, with the tip of the screw screwed into the threaded solid end of the split cylinder. To anchor the device to a wall, the user inserts it into a hole drilled into the wall, and tightens the screw, thereby creating a compressive load on the split cylinder. Tightening the screw further eventually causes the thin walls of the split cylinder to buckle, ultimately collapsing against the inner surface of the hollow wall. There are three factors that limit the applications of such devices. First, it is highly desirable to anchor objects to surfaces without using screws or adhesives, because doing so can speed installation, increase reliability, and minimize cost.

Second, expanding appendages take up space on the inner side of slabs, thereby preventing expanding anchors from being closely packed together. Closely packed components are important for electronic applications because the overall size of the electronics package affects both its cost and utility. Accordingly, the footprint of mechanically mounted components must be as small as possible on both sides of printed wiring boards. Further, the distance that anchoring devices protrudes beyond the underside of the board must be minimized to avoid interference with other objects in the electrical assembly.

Third, some applications require objects to be loosely, but securely, anchored to the slab. Although devices such as hollow-wall anchors can loosely anchor objects to a slab (or hollow wall) by simply loosening the screw from its tightest position, loose screws are not secure and typically loosen further over time. Uncontrolled loosening can foil the operation of those applications that depend upon precise separation between the slab and the anchored object. Such applications include check valves, for example. This is because all check vales incorporate elements, such as a diaphragm or plate, which must move to allow gases or fluids to pass through the valves in only one direction. The motion of the moveable element must be precisely constrained for check valves to perform reliably over time. Hence, loose screws are not suitable restraining mechanisms for such applications.

Dual anchor devices are commonly found in the field of electronics for coupling one electrical cable to another. Such couplers may be either panel-mounted on unmounted. In both cases, the active latching mechanism is typically incorporated in the end of the cables, not in the coupler. Further, in no case is the coupler a compound anchor wherein a first latching mechanism is the base for a second latching mechanism.

BRIEF SUMMARY OF THE INVENTION

This invention is a dual anchor device that quickly, inexpensively and space-efficiently anchors objects to free-standing slabs. The dual anchor device consists of a notched stem, affixed to the object to be anchored to the free-stand slab, and a bushing. The device works by first inserting the bushing into a hole through the free-standing slab, and then inserting the notched stem into the bushing. Doing so automatically anchors the entire assembly to the free-standing slab. The bushing employs a first anchoring mechanism, consisting of flexible legs, which automatically latch onto the free-standing slab, and a second anchoring mechanism, consisting of a split sleeve possessing ledges that latch onto the notch in the stem. A tight fit between the bushing and the free-standing slab can be created by sizing the gap between the bottom of the feet and the base of the bushing to be slightly less than the width of the free-standing wall, and automatically camming the feet over the free-standing slab when the stem is inserted into the bushing. A tight fit between the bushing and the object anchor can be obtained by incorporating bosses and cams between the mating surfaces of the bushing and object anchor. A controlled loose fit between the object to be mounted and the free-standing slab may be achieved by making the width of the notch in the stem longer than the width of the ledges at the end of the split sleeve.

DETAILED DESCRIPTION OF THE INVENTION

The dual anchor device presented in this invention quickly and reliably anchors objects to slabs without using screws or adhesives. The dual anchor device (device) consists of an anchor and a bushing. The object anchor must be either attached to, or integral with, the object to be mounted to a slab. The device requires a small hole (circular or otherwise) drilled or punched through the free-standing slab. The bushing automatically anchors itself to the slab when inserted through the small hole. The object anchor automatically anchors itself to the bushing when inserted into the bushing. These two consecutive anchoring actions anchor the object of interest to the slab.

Although flexible latches are commonplace (found in items ranging from battery pack covers to automobile glove boxes), they typically only latch onto a single object, not multiple objects. In contrast, this invention accomplishes two latching functions with a single part—the bushing. Further, the two latching features of the bushing are compounded in that the first latching element serves as the base for the second latching element. This compound arrangement allows the bushing to join mating objects with a minimum amount of space. Such space saving is the principal advantage of the present invention.

Figure 1:
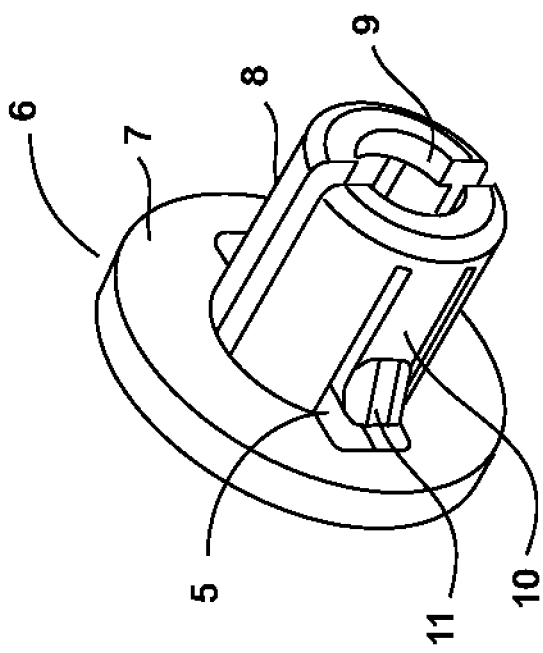
FIG. 1 is a perspective view of the bushing, in accordance with the present invention.

FIG. 1 depicts the bushing 6. The bushing 6 is comprised of a base 7, a split sleeve 8, two circular ledges 9, two flexible legs 10, and two feet 11. The base 7 is a flat disk with a hole in its center whose diameter matches the inner diameter of the split sleeve 8. The rectangular slot 17 through the base is to facilitate manufacturing the part via injection molding. The split sleeve 8 is a cantilevered element with its fixed end married to the base 7. The legs 10 are also cantilever elements that are integral to the split sleeve 8, with their fixed ends located at the free end of the split sleeve 8. The feet 11 are located at the free end of the legs 10 and lock the bushing 6 to a free-standing slab (not shown). The gap 5 is the space between the bottom of the feet 11 and the base 7 of the bushing 6, and is sized to accept the free-standing slab on which the object is to be mounted. The feet 11 have two sloped surfaces. A first sloped surface intersects the legs 10 and the outermost edges of the feet 11. This sloped surface allows the feet 11 to pass through a hole in a free-standing slab by camming the elastic legs 10 inward into the hollow space inside the split sleeve 8. A second sloped surface runs along the bottom of the feet, and slopes upward toward the outermost edge of the feet 11, with upward being defined as toward the free end of the split sleeve 8. This second slope allows the feet to make an interference fit with slabs that are slightly thicker than the gap 5. The interference fit is created when the feet 11 are manually forced over the slab when a cylindrically shaped object, such as a rod, is forced through the split sleeve 8. The outside diameter of such a rod must be slightly less than the inner diameter of the split sleeve 8.

Figure 2:
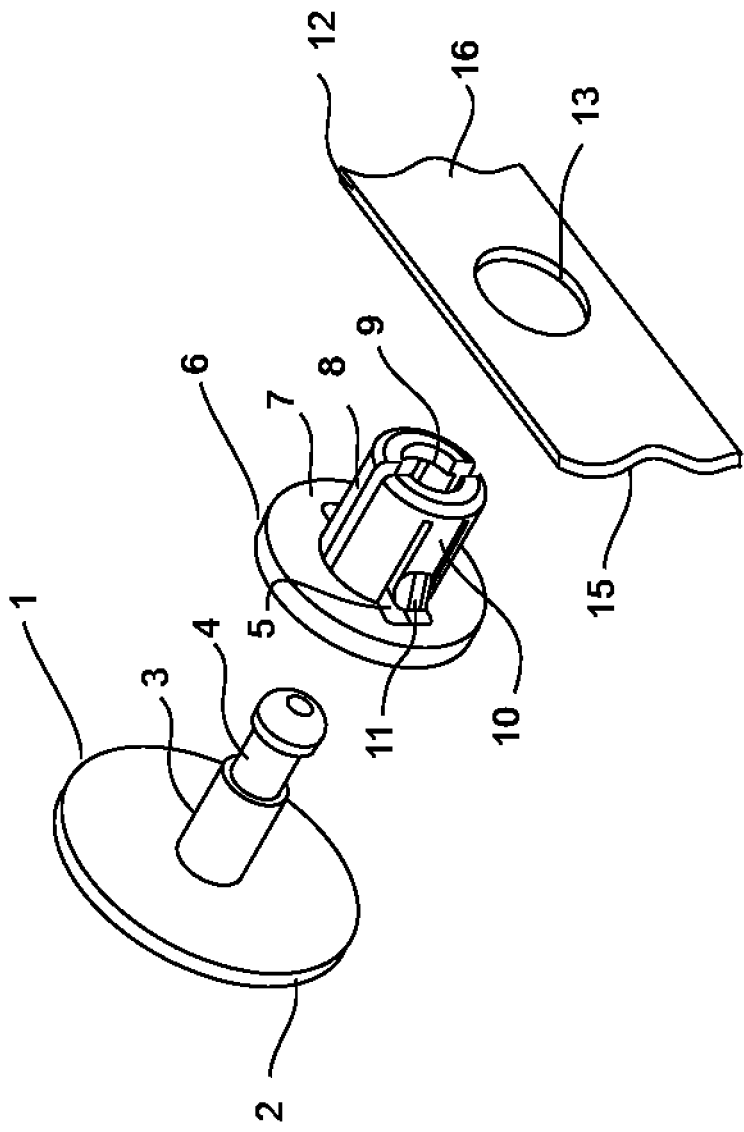
FIG. 2 shows an exploded view of the object anchor, bushing, and a free-standing slab with a hole through it.

FIG. 2 shows an exploded view of the object anchor 1, bushing 6, and free-standing slab 12. The object anchor 1 is comprised of an object interface 2 and a stem 3. For some applications, the stem 3 may be directly incorporated into the object to be mounted, thereby eliminating the object interface 2. The stem features a cylindrical notch 4, or neck, having a uniform diameter less than the stem 3 diameter at its fixed end, and located near the stem 3 free end whose function is to accept the ledges 9 present in the split sleeve 8. The stem 3 has a rounded end to permit the end to move past the ledges 9 when the stem 3 is inserted into the bushing 6. The bushing 6 latches onto the object anchor 1 when the ledges 9 engage the notch 4.

The free-standing slab 12 must have a hole 13 running all the way through it. The diameter of the hole 13 must be sized to allow the split sleeve 8 to just pass through. The slab 12 has an outer surface 15 which mates with the base 7 of the bushing 6, and an inner surface 16 that provides the latching surface for the feet 11. The distance between the free-standing slab 12 outer surface 15 and inner surface 16 is the free-standing slab thickness.

The assembly is mounted on the free-standing slab 12 by first inserting the split sleeve 8 into the hole 13, and then inserting the stem 3 all the way through the opening in the bushing 6. Inserting the split sleeve 8 into the hole 13 causes the feet 11 to initially flex diametrically inward. After the feet 11 clear the hole 13, they spring back outward, thereby locking the bushing 6 to the slab 12.

The next step is to insert the stem 3 into the bushing 6. The installation is complete when the ledges 9 snap onto the notch 4.

After assembly, the object anchor 1 will be loosely anchored to the bushing 6 because the notch 4 must be longer than the thickness of the ledges 9 for the two parts to snap together. As FIG. 2 illustrates, a controlled loose fit between the object to be mounted (not shown) and the free-standing slab 12 may be achieved by making the width of the notch 4 in the stem 3 longer than the width of the ledges 9 at the end of the split sleeve 8. However, this looseness may be eliminated by incorporating lands and bosses in the space between the bushing 6 and the object interface 2. The array of lands and bosses may be arranged so that rotating the object interface 2 around the axis of the stem 3 brings engages the bosses with the lands to eliminate play between the object anchor 1 and the bushing 6.

Figure 3:
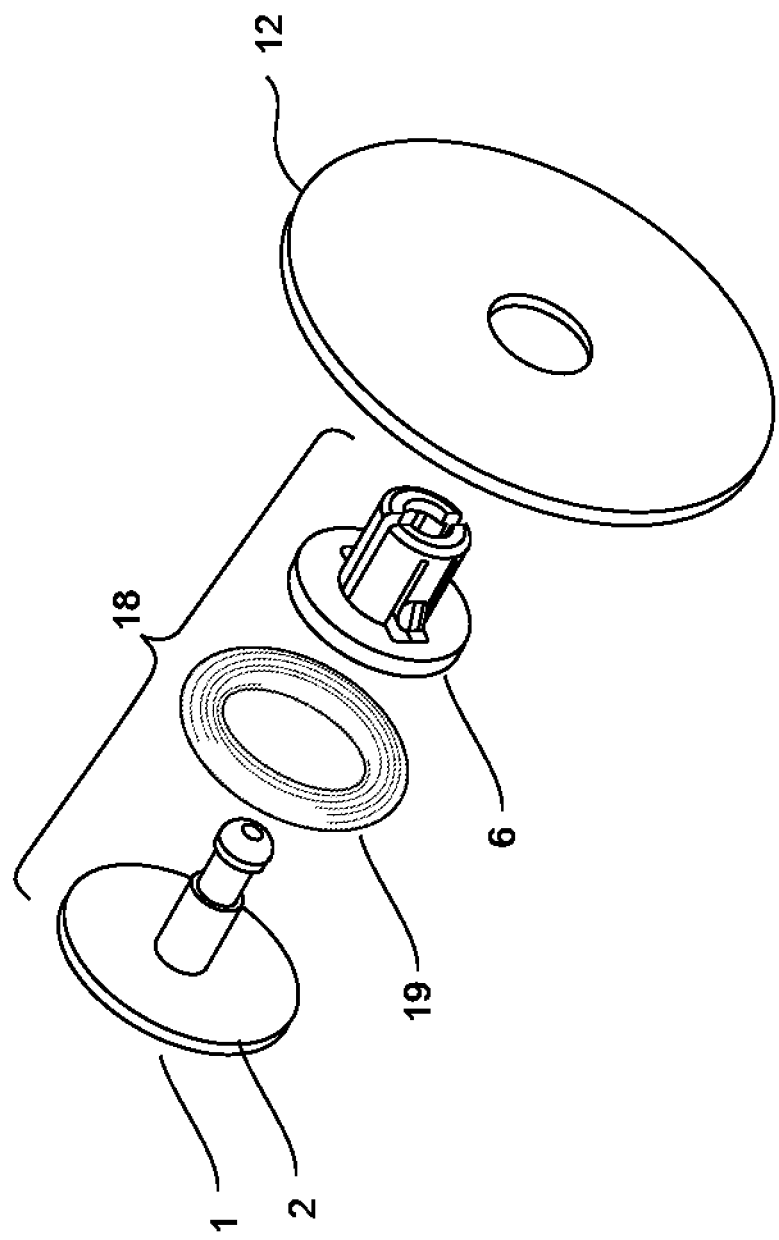
FIG. 3 is an exploded view of a check valve assembly consisting of a container lid, and an O-ring sandwiched between an object anchor and a bushing.

FIG. 3 shows an embodiment of the present invention in which a loose fit between the object anchor 1 and the bushing 6 is actually desirable. The assembly is transformed into a check valve 18 by inserting an O Ring 19 between the base 7 of the bushing 6 and the object interface 2. In this case, the free-standing slab 12, has the form of a circular lid, as might be used with Mason jars. The loose fit between mating parts allows the object interface 2 to move away from the O Ring 19 when a vacuum is applied to the check valve 18, thereby providing a path for air to escape from a container.

Numerous modifications to and alternative embodiments of the present invention will be apparent to those skilled in the art in view of the foregoing description. Accordingly, this description is to be construed as illustrative only and is for the purpose of teaching those skilled in the art the best modes of carrying out the invention. Details of the system may be varied substantially without departing from the spirit of the invention and the exclusive use of all modifications which come within the scope of the appended claims is reserved.

What I claim as my invention is:

1. A method for positively anchoring an object to a free-standing slab with a controlled loose fit between the object anchor and a outer surface of the free-standing slab by equipping said object anchor with a notched stem and by only pushing said notched stem into a single bushing featuring a split sleeve that has been previously anchored to said free-standing slab by only pushing the split sleeve of said bushing through a closely-fitting hole in the free-standing slab; and said bushing comprising in combination:
a base that abuts to the outer surface of the free-standing slab, wherein the said split sleeve is cantilevered with its fixed end anchored to said base, and has an inner diameter slightly larger than a diameter of said stem, and has two internal ledges at its free end that latch onto the notch or a recess in the stem, wherein a thickness of said ledges is less than a width of the said notch in the stem, thereby creating a controlled loose fit of the object anchor to the outer surface of the free-standing slab; and two cantilevered elastic legs integral with the said split sleeve, wherein the fixed ends of the cantilevered elastic legs are positioned at the free end of the cantilevered split sleeve, and the free end of the elastic legs are equipped with sloped bosses, or feet, that protrude diametrically outward from sides of the split sleeve, and a gap between the base and a bottom of the feet is sized to accept the free-standing slab on which the said object anchor is to be mounted; and the feet possessing a second sloped surface running along a bottom of the feet, and sloping upward toward an outermost edge of the feet, with upward being defined as toward the free end of the split sleeve, wherein this second slope allows the feet to make an interference fit with free-standing slabs that are slightly thicker than said gap, thereby enabling the said bushing to be tightly anchored to an inner surface of said free-standing slab yet obtaining a controlled loose fit between the object anchor and the outer surface of the free-standing slab.

2. The method of claim 1 wherein said notch is a cylindrical neck having a uniform diameter smaller than the diameter of said stem.

* * * * *